2,849,970

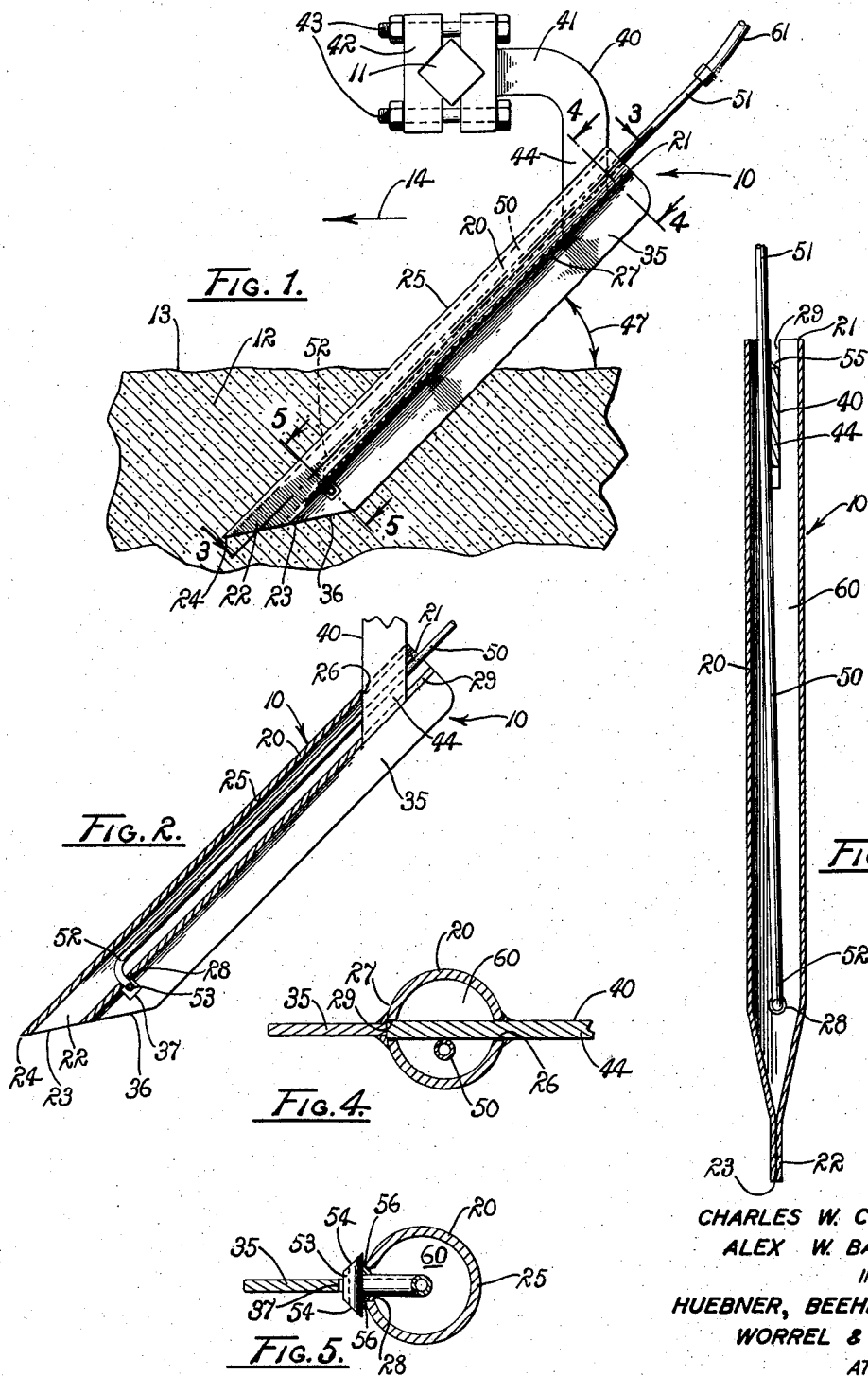
Sept. 2, 1958 — C. W. COBERLY ET AL — 2,849,970
SUBSOIL INJECTOR
Filed March 29, 1955

SUBSOIL INJECTOR

Charles W. Coberly, Visalia, and Alex W. Barsoom, Reedley, Calif., assignors to Coberly & Plumb, Hanford, Calif., a corporation of California Application March 29, 1955, Serial No. 497,532

10 Claims. (Cl. 111—7)

The present invention relates to agricultural implements and more particularly to an earth working tool for applying soil additives and treating materials to the soil, such as fertilizers, fungicides, herbicides and the like.

Scientific farming demands proper soil management and such management frequently requires the injection of soil additives and treating materials at appreciable depths. For example, the supplying of adequate available nitrogen for growing crops is a common problem. Anhydrous ammonia is known to be an excellent source of such nitrogen but its application is subject to such serious difficulties that its full utility has been impaired. To make its storage and handling practical, it is confined under liquifying pressure in tanks provided for the purpose. When it is released for soil application, a substantial proportion thereof volatilizes and unless entrapped in the soil is lost to the atmosphere.

A known expedient is to apply the anhydrous ammonia at a penetration depth of approximately four inches by an implement provided for the purpose. The implement includes an arcuate cultivator shank downwardly and forwardly curved into soil engagement from a tool carrier, tractor or other means for carrying the shank in earth traversing movement. A tube is mounted on the shank and has one end connected to a suitable source of liquid anhydrous ammonia and an outlet beneath the surface of the soil. During earth traversing movement, the cultivator shank cuts a furrow in front of the tube and a regulated flow of ammonia is deposited in the furrow. As the ammonia is discharged from the tube it is from 75% to 85% in liquid form and from 25% to 15% gas. To avoid loss of the gas, it must be promptly and effectively captured by a covering operation. This has heretofore constituted a major obstacle.

It is the usual experience that ground which it is desired to fertilize or otherwise treat in this manner contains appreciable quantities of trash such as cornstalks, cotton stalks, roots, vine runners, weeds and other debris enmeshed in the soil. The conventional curved cultivator shanks described rapidly accumulate the trash and since they must be employed in laterally adjacent groups adequately to apply and distribute the ammonia or other material, they frequently act more effectively as a rake than as a fertilizer applicator. The accumulated trash carried through the soil with each shank causes the formation of excessively wide furrows having compacted sides which fail to fall back into the furrow and cover the applied ammonia. This condition is seriously aggravated when the soil is sufficiently moist to cake.

Inasmuch as anhydrous ammonia vaporizes quickly under conditions of ordinary temperature and pressure, failure to provide a covering of soil thereover results in complete loss. Under even optimum conditions, it is difficult to avoid very substantial loss. Also, collection of trash on the implement and its periodic removal leaves piles of trash scattered around on the field.

The described trash problem has been so serious in the past that many farmers have refused to employ anhydrous ammonia notwithstanding that it has been the most economical source of nitrogen available.

Another problem involved in the direct application of anhydrous ammonia is best explained by reference to the conventional injecting implement generally described above. Since liquid anhydrous ammonia volatilizes at −28° F. at normal atmospheric pressure, it will be apparent that its passage through an injection tube for discharge into the soil results in release to atmospheric pressure, refrigerates the tube and therefore, frost quickly gathers thereon. Further, because of the normally moist character of soil several inches below the surface, ice readily forms at the outlet of the injection tube. This ice formation attracts soil thereto and after a period of time a hard mass of ice and soil results, sometimes approximating five to seven inches in diameter. This clogs or otherwise restricts proper passage of anhydrous ammonia through the outlet, necessitates additional cleaning of the tool and again, tends to produce wider furrows than desired.

The solution to these problems afforded by the present invention have been reached only after extensive experimentation and observation of existing devices. It is believed that the significance of the present invention will be more fully appreciated when silhouetted against the prior art typified by several of the known forms of anhydrous ammonia injection tools, briefly alluded to below.

First, it was sought to avoid collection of trash by mounting the shanks, in which injection tubes were supported, along a tool bar in alternate, forwardly and rearwardly spaced, staggered relation relative to a predetermined direction of earth traversing movement. In this manner an attempt was made to permit collected trash to peel off between the shanks. This expedient has not proved successful.

Spring coil shanks were employed and were of some aid but were by no means satisfactory. Further, coulter wheels were added forwardly of the shanks in an attempt to cut through the trash in advance of the shanks and supported injection tubes. This latter device was ineffective because their tendency to ride over the trash pulled the shanks and injection tubes out of the soil, a result similar to that experienced with spring shanks. Some improvement was realized by the addition of wheels rotatably mounted laterally adjacent to the shanks and having peripheral radially projected pins or cleats adapted for successive earth engagement thereby to "step" on trash accumulating around the shanks to pull it therefrom. Besides being generally unsatisfactory in solving the trash problem, these devices were expensive, cumbersome, impractical and tended to pack the soil.

Another apparatus also found to be unsuccessful, employed an ordinary gang of disk harrows with a plurality of shanks mounted between the disks for swivelling movement around vertical axes and curved rearwardly relative to the direction of movement. As before, injection tubes were extended down the trailing edges of the shanks. This implement has met with more favor than those previously discussed because disking can be accomplished simultaneously with fertilizer injection. However, it does not prevent trash collection and clogging still results with the disadvantages incident thereto.

With the foregoing in mind, a general object is to provide an improved implement for injecting fertilizers and other soil additives and treating materials into the soil.

Another object is to provide an improved device for directly applying anhydrous ammonia to the soil.

Another object is to minimize trash collection on implements used to inject materials into the soil.

Another object is to prevent freezing and the formation of ice on apparatus adapted to inject anhydrous ammonia and other pressure liquified materials into the soil.

Another object is to prevent the formation of masses of dirt and ice around a fertilizer injection tube in earth penetrating position which is adapted to discharge volatile liquids into the soil.

Another object is to provide an injector of the character described which utilizes heat generated by frictional engagement with the soil to counteract refrigeration of volatile materials released thereby.

Another object is to provide an implement for injecting anhydrous ammonia into the soil which is simple and economical in construction, easily employed, relatively light in weight in comparison to prior art devices, and which is fully effective in accomplishing its intended purposes.

These and other objects will become more fully apparent upon reference to the following description.

In the drawing:

Fig. 1 is a side elevation of an earth working tool mounted for earth traversing movement on a tool bar for applying soil treating materials in accordance with the principles of this invention.

Fig. 2 is a fragmentary, vertical longitudinal section taken through the implement of Fig. 1 in a plane aligned with the normal direction of movement thereof.

Fig. 3 is a somewhat enlarged fragmentary longitudinal section taken on line 3—3 of Fig. 1.

Fig. 4 is a fragmentary somewhat enlarged transverse section taken on line 4—4 of Fig. 1.

Fig. 5 is a somewhat enlarged transverse section taken on line 5—5 of Fig. 1.

Referring more particularly to the drawing:

An agricultural implement, generally indicated by the numeral 10, is shown in Fig. 1 attached to a horizontally disposed tool bar 11 in elevational spaced relation to soil or earth, indicated at 12 having an upper surface 13. The tool bar is mounted on any suitable draft appliance, not shown, and is carried in earth traversing movement in a predetermined direction of movement, generally indicated by the arrow 14. Although only a single implement 10 is shown in the drawing, it is to be understood that in practice, a plurality of such implements are generally provided in transverse spaced relation along the tool bar. However, inasmuch as such tools are identical in construction, only one is shown and described.

The implement 10 provides an elongated substantially straight, hollow, cylindrical sleeve 20 having an upper open end 21 and a lower flattened end 22, best seen in Fig. 3, adapted for penetrating engagement in the soil 12. The lower end of the sleeve provides a beveled lower edge 23 angularly related to the longitudinal axis of the sleeve and terminating in a forwardly disposed pointed tip 24. The sleeve is substantially cylindrical in form and provides an arcuate forward or leading surface 25 having an elongated slot 26 longitudinally thereof adjacent to the upper end thereof and an arcuate rearward or trailing surface 27 providing a lower opening 28 adjacent to the lower end and an elongated slot 29 longitudinally thereof and in a plane common to the slot 26.

An elongated substantially flat reinforcing fin 35 is rigidly connected longitudinally of the rearward surface 27 of the sleeve 20 and extends radially outwardly therefrom. The reinforcing fin provides a lower beveled edge 36 rearwardly extended in substantially co-linear relation with the lower beveled edge 23 of the sleeve. In addition, the reinforcing fin provides an aperture 37 adjacent to the lower opening 28 in the sleeve.

A support or mounting arm 40, best seen in Fig. 1, provides a forwardly extended straight portion 41 having a clamp 42 integrally attached thereto for releasable engagement on the tool bar 11 and held in position thereon by a plurality of bolts 43, as is well known in the art. The support arm has a downwardly extended portion 44 fitted through the elongated upper slot 26 in the sleeve 20 and diametrically extended through the sleeve for rigid connection, as by welding, to the reinforcing fin 35 through slot 29. The sleeve is, therefore, mounted on the tool bar in downwardly inclined position relative thereto with the lower flattened or penetrating end 22 in earth penetrating engagement. In this regard, it is to be noted that the sleeve is in acute angular relation with the surface 13 of the soil 12 as defined by penetration angle 47, identified in Fig. 1. Obviously, elevational control of the tool bar 11, as is well known, elevationally controls the implement 10 and serves to raise it to and from earth engagement as well as to permit regulation of depth of soil engagement.

An elongated substantially cylindrical injector tube 50 is substantially concentrically positioned within the sleeve 20 and provides an upper end 51 extended outwardly of the open upper end 21 of the sleeve. The tube has a lower end 52 extended through the lower opening 28 in the sleeve and is connected in fluid communication with a T-section outlet 53 in right angular relation thereto and extended transversely of the reinforcing fin 35 within the lower cut-out opening 37 therein, as shown in Fig. 5. The T-section preferably is provided with rearwardly inwardly beveled ends 54. The injector tube is rigidly secured in the sleeve by connection thereof to the downwardly extended portion 44 of the support arm 40 and to the sleeve adjacent to the opening 29, as by welding, indicated, respectively, at 55 and 56.

Inasmuch as the injector tube 50 is extended substantially concentrically within the sleeve 20, an annular circumscribing insulating air space 60 is defined between the tube and the sleeve throughout substantially the entire length of the tube. A flexible supply conduit 61 is connected to the upper end 51 of the tube for supplying anhydrous ammonia under liquifying pressure to the tube from a suitable supply tank, not shown, carried in earth traversing movement with the tool bar 11.

*Operation*

The operation of the device of the present invention is believed to be readily apparent and is briefly summarized at this point.

With the implement 10 attached to tool bar 11, a forward draft in the direction of the arrow 14 is imparted to the tool bar by a prime mover, not shown. As the implement is moved forwardly, the sleeve 20 is inclined downwardly and forwardly from the tool bar with the lower end 22 thereof penetrating the soil 12 at a depth of approximately six to eight inches and at an angle 47 of approximately forty-five degrees relative to the surface 13 of the soil. As will soon become apparent, this angularity is of particular significance.

As the sleeve 20 digs through the soil providing a narrow furrow, liquid anhydrous ammonia under high pressure is then forced through the supply conduit 61 for delivery through the injection tube 50. The ammonia passes down the tube and laterally out of the T-section outlet 53 into the furrow in the soil. It will be noted in Fig. 5 that the rearwardly beveled ends 54 of the outlet 53 lie inwardly of the flow lines of soil about the implement during use thereof. These flow lines can be visualized as rearwardly convergent lines on opposite sides of the implement tangential to the sleeve 20 and intersecting at the rearward edge of the fin 35 thus defining cavities on opposite sides of the fin adjacent to the sleeve. Because of the downwardly convergent character of the lower end of the sleeve 20 to a single blade-like edge 23, the cavities are similarly downwardly constricted to receive the ammonia in a narrow, easily covered furrow. The provision of a furrow by the sleeve permits easy exit of ammonia from the T-section outlet while soil displaced by the sleeve to provide such furrow readily falls back in place rearwardly of the reinforcing fin 35 thereby quickly covering the ammonia after its discharge so as to capture liquid and gaseous ammonia alike.

The problems of prior art devices, discussed above, are alleviated by the structure and mounting of the implement 10. The elongated straight construction of sleeve 20 and its acute angle of penetration or incidence 47 relative to the soil has been found remarkably effective in avoiding trash collection thereon. In addition, the arcuate forward or leading surface 25 of the sleeve when the sleeve is set at the acute angle noted markedly facilitates trash shedding. Instead of accumulating as in the previous devices, such trash as cornstalks, cotton stalks, roots, vine runners, weeds, and other debris tend to rise slightly along the sleeve and then to fall downwardly at either side thereof back onto the soil. Whereas conventional forwardly curved shanks and other devices discussed above have been constant cause of trash collection, the implement 10 providing sleeve 20 has completely eliminated the problem. Although the character of the trash encountered influences its tenacity for adherence to tools drawn therethrough and thus the ease of shedding, the angle of incidence 47 is worthy of especial note. While no precisely specific definition of critical limits can be given for the angularity which will be accurate under all circumstances, certain general observations are noteworthy. If the angle is much greater than 45° the entangling is excessive. If much less than 45°, the trash tends to slide upwardly on the sleeve 20 and similar entangling ensues unless the sleeves are of very great length which is, of course, uneconomical. Further, any substantial departure of the sleeve from its straight form is conducive to entangling.

In actual practice, the described implement has been found to obviate congestion by freezing and the described accumulation of ice by the prior devices which interfered with proper operation and caused excessively large trenches to be formed. Inasmuch as the tube 50 and outlet 53 have no constrictions, being of substantially uniform internal diameter throughout, the refrigeration effect of the release of anhydrous ammonia from liquifying pressure is substantially uniformly distributed therealong. There is nothing unique in this particular arrangement but it will be noted that the tube is at all points insulated from the sleeve 20 by a circumscribing blanket of air. The tube is disposed within the open topped hollow interior of the tube in which the convectional circulation of air about the tube is of particular significance. While the tube admittedly exercises a refrigerating effect on the air, it is isolated from soil moisture and almost no frost accumulates thereon. Further, as air is cooled by the tube it descends into the lower end portion of the sleeve 20 because of its increase in density. Frictional engagement of the sleeve with earth through which it is drawn has a warming effect thereon so that the cold descending air is then warmed and rises to exercise a warming effect on the tube. The air is subsequently again cooled and returns in the circulatory pattern noted. Inasmuch as moist air is known to be more buoyant than dry air, all excessively moist air rises from the upper end of the sleeve and thus the action is one of drying rather than providing a source of moisture conducive to frost accumulation and of distributing heat throughout the interior of the sleeve caused by friction with the soil. It is also found that the delivery of the anhydrous ammonia from the tube 50 into the cross head 53 for emission through the two outlets 54 in the described cavities avoids the accumulation of ice or frost in the outlet. This also may be partially due to the discharge closely adjacent to the frictional engagement of the sleeve 20 with the soil in forming the trench and thereby taking advantage of warming effect incident thereto.

From the foregoing, it will be evident that a simple inexpensive yet highly effective agricultural implement has been provided which avoids many long unsolved problems in the art of directly applying anhydrous ammonia and other soil treating materials to the soil.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. An agricultural implement for injecting liquid anhydrous ammonia into the soil comprising an elongated substantially cylindrical straight hollow sleeve having a flattened soil penetrating end with a pointed tip adapted for earth penetrating engagement, and an open opposite end, an elongated reinforcing fin integrally attached longitudinally of the sleeve and radially extended therefrom, a mounting arm having a tool connecting portion extended diametrically through the sleeve in obtuse angular relation therewith adjacent to the upper open end and integrally connected to the reinforcing fin, the mounting arm also having a tool bar connecting portion perpendicularly extended from the tool connecting portion in the same horizontal direction therefrom as the tip of the sleeve, an elongated injection tube substantially concentrically positioned within the sleeve in peripherally spaced relation from the sleeve to provide an annular insulating layer of air between the tube and the sleeve, the tube having a discharge end extended through the penetrating end of the sleeve and an opposite supply end extended out the open end of the sleeve, and means for supplying anhydrous ammonia to the supply end of the tube for passage therethrough to the discharge end for deposit in the soil.

2. An implement for injecting liquid anhydrous ammonia into the soil comprising an elongated substantially straight hollow sleeve, means mounting the sleeve for earth traversing movement in predetermined direction in relation thereto with the sleeve downwardly and forwardly extended into earth engagement at an angle of approximately 45° relative to the surface of the earth whereby the sleeve has a lower forward end, an upper rearward end, a forwardly disposed surface, and a rearwardly disposed surface, the lower end of the sleeve being downwardly transversely constricted to a closed elongated soil penetrating edge aligned with the direction of movement of the sleeve and upwardly inclined from the forward surface to the rearward surface of the sleeve; an elongated flat fin rigidly secured longitudinally along the rearward surface of the sleeve and rearwardly extended therefrom relative to the direction of earth traversing movement, the fin having a lower edge substantially aligned with the pentrating edge of the sleeve; a tube mounted substantially concentrically within the sleeve having an upper end portion and a lower end portion, said lower end portion etxended rearwardly through the sleeve adjacent to the lower end thereof and opening to the soil on opposite sides of the fin closely adjacent to the sleeve; and means for connecting the upper end of the tube to a source of anhydrous ammonia under liquefying pressure.

3. An implement as defined by claim 2 in which the tube from the means connecting the tube to the source of anhydrous ammonia and its opening to the soil is of substantially constant internal diameter.

4. An agricultural implement for injecting a flowable material into the soil, which material is under initial compression upon release causes a refrigeration effect, comprising an elongated substantially straight hollow sleeve having a sharpened end adapted for earth penetrating engagement and an open upper end, said sleeve being reinforced against bending incident to earth penetrating engagement, means rigidly mounting the sleeve for earth traversing movement with the sleeve downwardly and forwardly extended into earth engagement, an elongated injection tube rigidly mounted substantially axially within the sleeve in radially spaced relation from the sleeve to provide an annular layer of air circumscribing the tube between the tube and the sleeve substantially the full length of the sleeve, the tube having a discharge end opening through the penetrating end of the sleeve and an opposite supply end, and means for supplying said flowable material under compression connected to the supply end of the tube for passage of said material through the tube to the discharge end under reduced pressure for deposit in the soil whereby the material during passage through the tube expands in a refrigerating effect upon the tube in insulating spaced relation to the sleeve.

5. The implement of claim 4 in which the sleeve is reinforced by an elongated fin integral with the sleeve extended longitudinally along the rearwardly disposed side of the sleeve.

6. The implement of claim 4 in which the sleeve is substantially cylindrical and is downwardly transversely constricted to the sharpened end providing a closed elongated soil penetrating edge aligned with the direction of movement of the sleeve.

7. The implement of claim 4 in which the sleeve provides a forwardly disposed blunt, rounded surface substantially concentric to the tube.

8. In combination with a tool bar mounted for substantially horizontal earth traversing movement transversely of its length so as to provide a forward side and a rearward side, a tool for injecting liquid anhydrous ammonia into the soil comprising an elongated substantially straight sleeve rigidly mounted on the tool bar in forwardly downwardly directed attitude having a sharpened end adapted for penetrating engagement in the soil and an opposite open end adapted to extend out of the soil, means reinforcing the sleeve against bending incident to earth penetrating engagement, an elongated rigid ammonia injection tube longitudinally extended through the sleeve having a discharge end opened outwardly through the penetrating end of the sleeve and a supply end adapted for connection to a source of liquid anhydrous ammonia under liquifying pressure for supplying ammonia to the tube for passage therethrough into the soil through said discharge end, said ammonia in passing through the tube having a refrigerating effect thereon, and means rigidly mounting the tube within the sleeve in circumferentially spaced relation thereto to provide an annular insulating layer of air between the tube and the sleeve and circumscribing the tube to minimize refrigeration of the sleeve.

9. An implement for injecting liquid anhydrous ammonia into the soil comprising an elongated substantially straight hollow sleeve having a closed sharpened earth penetrating end and an opposite open end; means mounting the sleeve for earth traversing movement with the sleeve downwardly and forwardly extended at an angle of approximately 45° relative to the surface of the earth and with the upper end disposed above the ground; and an elongated tube rigidly mounted substantially concentrically within the sleeve in peripherally spaced relation to the sleeve having an open lower end rearwardly disposed relative to the direction of earth traversing movement opened through the sleeve beneath the surface of earth traversed and an upper end extended upwardly from the upper end of the sleeve adapted for connection to a source of anhydrous ammonia under liquifying pressure, there being an annular layer of air surrounding the tube and insulating it from the sleeve so as to minimize refrigeration of the sleeve as a result of vaporization of the liquid ammonia during passage through the tube.

10. An implement for supplying fluid materials to the soil which is adapted to minimize collection of trash thereon comprising an elongated substantially straight hollow sleeve, means mounting the sleeve for earth traversing movement in a predetermined direction in relation thereto with the sleeve downwardly and forwardly extended into earth engagement at an angle of approximately 45° relative to the surface of the earth whereby the sleeve has a lower forward end, an upper rearward end, a forwardly disposed surface, and a rearwardly disposed surface, the lower end of the sleeve being downwardly transversely constricted to a closed soil penetrating edge substantially aligned with the direction of movement of the sleeve; an elongated flat reinforcing fin rigidly secured in longitudinal position along the rearward surface of the sleeve and rearwardly extended therefrom relative to the direction of earth traversing movement, the fin having a lower edge substantially aligned with the penetrating edge of the sleeve; and a tube rigidly mounted within the sleeve in spaced relation thereto providing an annular layer of air between the tube and the sleeve substantially coextensive with the tube within the sleeve having a lower end opening through the sleeve and an upper end adapted for connection to a source of fluid under pressure, the annular layer of air serving to insulate the sleeve from the tube.

References Cited in the file of this patent

UNITED STATES PATENTS

| 2,598,121 | Hannibal | May 27, 1952 |
| 2,691,358 | Peck | Oct. 12, 1954 |
| 2,713,299 | Shager et al. | July 19, 1955 |
| 2,722,105 | Keyes | Nov. 1, 1955 |

FOREIGN PATENTS

| 698,592 | Great Britain | Oct. 21, 1953 |